US007648032B2

(12) United States Patent
Yuan et al.

(10) Patent No.: US 7,648,032 B2

(45) Date of Patent: Jan. 19, 2010

(54) EFFECTIVE REDUCTIVE BLEACHING OF MINERAL SLURRIES

(75) Inventors: Jun Yuan, Kathleen, GA (US); Robert J. Pruett, Milledgeville, GA (US); Larry C. Powell, Wrightsville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 690 days.

(21) Appl. No.: 10/592,142

(22) PCT Filed: Mar. 22, 2005

(86) PCT No.: PCT/US2005/009355

§ 371 (c)(1), (2), (4) Date: Sep. 8, 2006

(87) PCT Pub. No.: WO2005/095709

PCT Pub. Date: Oct. 13, 2005

(65) Prior Publication Data

US 2007/0194276 A1 Aug. 23, 2007

Related U.S. Application Data

(60) Provisional application No. 60/555,401, filed on Mar. 23, 2004.

(51) Int. Cl.

| | |
|---|---|
| ***B01B 1/04*** | (2006.01) |
| ***C04B 33/04*** | (2006.01) |
| ***C09C 1/02*** | (2006.01) |
| ***C09C 1/42*** | (2006.01) |
| ***C02F 1/70*** | (2006.01) |
| ***C01B 17/64*** | (2006.01) |
| ***C01B 33/26*** | (2006.01) |
| ***C01B 31/24*** | (2006.01) |

(52) U.S. Cl. ............................ 209/10; 209/5; 423/264; 423/265; 423/270; 423/271; 423/275; 423/328.3; 423/335; 423/340; 423/419.1; 423/421; 106/415; 106/463; 106/464; 106/468; 106/469; 106/470; 106/486; 252/188.2; 252/188.21; 252/188.24; 252/188.26; 162/72; 162/82; 162/83; 162/70; 162/181.3; 162/181.8; 241/1; 210/710; 210/757

(58) Field of Classification Search .................. 209/10; 423/264; 106/468, 486; 252/188.2, 188.26; 162/72, 82

See application file for complete search history.

(56) References Cited

U.S. PATENT DOCUMENTS

| | | | | |
|---|---|---|---|---|
| 3,450,257 A | | 6/1969 | Cundy | |
| 4,227,920 A | | 10/1980 | Chapman et al. | |
| 4,859,246 A | | 8/1989 | Sennett | |
| 5,227,349 A | | 7/1993 | Matthews et al. | |
| 5,429,716 A | * | 7/1995 | Hache et al. | 162/7 |
| 5,522,924 A | | 6/1996 | Smith et al. | |
| 5,685,900 A | | 11/1997 | Yuan et al. | |
| 6,235,107 B1 | | 5/2001 | Yuan | |
| 6,602,385 B1 | | 8/2003 | Drummond | |
| 6,615,987 B1 | | 9/2003 | Greenhill et al. | |
| 2003/0062138 A1 | * | 4/2003 | Hache et al. | 162/24 |
| 2006/0081345 A1 | * | 4/2006 | Huang et al. | 162/78 |
| 2006/0185557 A1 | * | 8/2006 | Garska et al. | 106/484 |
| 2006/0249051 A1 | * | 11/2006 | Pruett et al. | 106/484 |
| 2006/0249270 A1 | * | 11/2006 | Alves et al. | 162/181.8 |
| 2008/0264295 A1 | * | 10/2008 | Taylor et al. | 106/31.13 |

FOREIGN PATENT DOCUMENTS

| | | |
|---|---|---|
| DE | 195 30 062 A1 | 2/1997 |
| WO | WO 90/01581 | 2/1990 |
| WO | WO 00/69977 | 11/2000 |
| WO | WO 01/70644 A1 | 9/2001 |

* cited by examiner

*Primary Examiner*—Joseph D Anthony

(74) *Attorney, Agent, or Firm*—Finnegan, Henderson, Farabow, Garrett & Dunner L.L.P.

(57) ABSTRACT

Disclosed herein are a method of reductively bleaching a mineral slurry comprising adding in the mineral slurry an effective amount of a formamidine sulfinic acid (FAS) and an effective amount of a borohydride to reductively bleach the mineral slurry, compositions comprising a mineral slurry, a FAS, and a borohydride, and final products comprising a mineral obtained by the method disclosed herein.

26 Claims, No Drawings

EFFECTIVE REDUCTIVE BLEACHING OF MINERAL SLURRIES

This application claims benefit of U.S. Provisional Application No. 60/555,401, filed Mar. 23, 2004, which is incorporated herein by reference.

Disclosed herein is a method of reductive bleaching mineral slurries using a formamidine sulfinic acid (FAS), also known as thiourea dioxide, and a borohydride. Also disclosed herein are compositions comprising an aqueous mineral slurry, an FAS, and a borohydride.

Manufacturers of paper, paper coatings, plastic compositions, and non-aqueous surface coatings such as paints and film laminates use minerals, such as kaolin and calcium carbonate, as property enhancing pigments or fillers in these products.

The appearance of paper, plastic compositions, and surface coatings, such as the whiteness and brightness of the product, is significant, especially in the finer grades of printing and writing papers, plastics employed in consumer goods, and decorative surface coatings. Therefore, high degree of whiteness and brightness of minerals, such as kaolin and calcium carbonate, are usually desirable for most of these products.

To achieve high degree of whiteness and brightness of the minerals, a reductive bleaching process is usually used, in which a reductive bleaching agent is added to the mineral slurries. Hydrosulfites, such as sodium hydrosulfite and zinc hydrosulfite, have been used as the reductive bleaching agent for brightening minerals, such as kaolin clay, because hydrosulfites are effective and can cause fast reductive reaction in a low pH condition. However, hydrosulfites can become less effective in a neutral or a high pH condition and the reaction can take a long time, such as days.

Therefore, there remains a need for effectively bleaching minerals. The present inventors have discovered that the use of a combination of a FAS and a borohydride as reductive bleaching agents can effectively bleach minerals, such as kaolin and calcium carbonate, and can provide, for example, higher brightness in comparison with using FAS or borohydride alone. It is believed that FAS and borohydride can serve to activate each other and can enhance the bleaching effects beyond that obtained using FAS or borohydride alone. The bleaching effects can be even better when the reductive bleaching process uses the combination of a FAS and a borohydride as reductive bleaching agents in an alkali condition. One benefit of using this combination under these conditions include avoiding flocculation of kaolin slurries which can be an unavoidable side effect when using low pH bleaching.

Accordingly, one aspect of the present disclosure relates to a method of reductive bleaching a mineral slurry, comprising including in the mineral slurry an effective amount of a FAS and an effective amount of a borohydride to reductively bleach the mineral slurry.

Another aspect of the present disclosure provides a composition comprising a mineral slurry, a FAS, and a borohydride.

As disclosed herein, the term "mineral" is commonly known in the art. Non-limiting examples of such materials include kaolin, calcium carbonate, talc, mica, gypsum, silica, barium sulfate, and feldspar. The mineral slurry disclosed herein comprises at least one mineral chosen, for example, from kaolin and alkaline earth metal carbonates, such as calcium carbonate.

Kaolin products and calcium carbonate products can usually be supplied in slurry forms. Calcium carbonate products can be in the form of precipitated calcium carbonate (PCC) or ground calcium carbonate (GCC). PCC is generally prepared by a process in which calcium carbonate is calcined to produce calcium oxide, or "quicklime," the quicklime then is "slaked" with water to produce an aqueous slurry of calcium hydroxide, and finally, the calcium hydroxide is carbonated with a carbon-dioxide-containing gas to produce PCC. GCC may comprise ground naturally occurring calcium carbonate from sources such as marble, limestone, and chalk. PCC may also be ground.

As used herein, the term "slurry" means a dispersion of finely divided solid particles in a liquid medium, typically an aqueous medium such as water.

The alkaline earth metal carbonates can be chosen, for example, from calcium carbonate, such as PCC and GCC, and magnesium carbonate, such as dolomite.

The calcium carbonate used according to one embodiment of the present disclosure comprises GCC at a solids content ranging from about 15% to about 80% by weight solids, such as from about 20% to about 75% by weight solids, and further such as from about 40% to about 70% by weight solids.

In addition to GCC materials, the process, the composition, and the product disclosed herein also apply to PCC, prepared by methods well known in the art. In the PCC bleaching process of the present disclosure, the composition may be added before, during or after the PCC manufacturing process, provided that it does not interfere with calcium carbonate manufacture, or adversely affect the bleaching. Alternatively, the composition may be added to the PCC either before, during or after grinding, one embodiment of the present disclosure comprising conducting the reductive bleaching process after PCC grinding.

The PCC slurries produced according to the present disclosure may also comprise calcium carbonate solids in the same amount as previously noted with regard to the GCC product described herein.

In the method of reductive bleaching of a mineral slurry disclosed herein, the FAS and the borohydride can be added in various forms, such as in an aqueous solution. In addition, the FAS and the borohydride can be added at the same time as a mixture, or subsequently to each other. The effective amount of the FAS included in the mineral slurry can be, for example, ranging from about 125 ppm to about 2,500 ppm on a dry basis, such as from about 250 ppm to about 1,000 ppm on a dry basis.

The borohydride can be chosen from its various salt forms. In one embodiment, the borohydride used herein is sodium borohydride. The effective amount of the sodium borohydride included in the mineral slurry is, for example, at least about 5 ppm on a dry basis. The effective amount of the sodium borohydride added in the mineral slurry can range, for example, from about 20 ppm to about 1,000 ppm, such as from about 30 ppm to about 120 ppm, and further such as from about 50 ppm to about 500 ppm, on a dry basis.

In one embodiment, the effective amount of the FAS included in the mineral slurry ranges from about 125 ppm to about 2,500 ppm on a dry basis and the effective amount of the borohydride included in the mineral slurry ranges from about 125 ppm to about 1,000 ppm on a dry basis.

In another embodiment, the effective amount of the FAS included in the mineral slurry ranges from about 250 ppm to about 750 ppm on a dry basis and the effective amount of the sodium borohydride included in the mineral slurry ranges from about 125 ppm to about 500 ppm on a dry basis.

The final slurry resulting from the method disclosed herein can have a pH value of higher than about 6.0, such as higher than about 6.5, further such as higher than about 7.0, and even further such as ranging from about 8.0 to about 13.0.

As would be expected, at a higher temperature, the bleaching reaction occurs at a higher rate. The temperature of the bleaching reaction in the method disclosed herein can be at room temperature (20° C.) or lower. However, the reaction can also be performed at a relatively higher temperature, for example, at least about 50° C. In one embodiment, the temperature of the bleaching reaction in the method disclosed herein ranges from about 50° C. to about 90° C., such as from about 70° C. to about 75° C. In addition, the time for the reductive reaction in the method disclosed herein can range, for example, from about 5 minutes to about 24 hours, such as from about 30 minutes to about 60 minutes. In all of the above, it should be understood that it is also permissible for the bleached mineral slurry to be stored after bleaching without need for any additional steps to terminate the reaction.

The final product, such as kaolin and alkaline earth metal carbonates, for example, calcium carbonate, produced by the method disclosed herein can have an enhanced brightness by, for example, at least about 0.2% GE brightness units, such as from about 2% GE brightness units to about 10% GE brightness units, in comparison with the mineral slurry without any reductive bleaching (i.e., the control). In one embodiment, the final product produced by the method disclosed herein has a brightness ranging from about 83% GE brightness units to about 98% GE brightness units or higher. It should be apparent that the brightness gain produced by the process described herein can be varied over a considerable range depending on the process control strategy and the balance of brightness versus cost desired.

The brightness of the product produced by the method disclosed herein can be measured by standard methods known to one of ordinary skill in the art. GE Brightness, as used herein for measuring pigment brightness, is defined in TAPPI Standard T457 and refers to the percentage reflectance to light of a 457 nm wavelength according to methods well known to those of ordinary skill in the art.

In the composition disclosed herein, the concentration of the FAS in the mineral slurry can range, for example, from about 125 ppm to about 2,500 ppm, such as from about 250 ppm to about 1,000 ppm, on a dry basis.

The borohydride can be chosen from its various salt forms. In one embodiment, the borohydride used herein is sodium borohydride. The concentration of the sodium borohydride in the mineral slurry can be at least about 5 ppm on a dry basis. For example, the concentration of the sodium borohydride can range from about 20 ppm to about 1,000 ppm, such as from about 30 ppm to about 120 ppm, and further such as from about 50 ppm to about 500 ppm, on a dry basis.

In one embodiment, the concentration of the FAS in the mineral slurry ranges from about 125 ppm to about 2,500 ppm on a dry basis and the concentration of the sodium borohydride ranges from about 125 ppm to about 1,000 ppm on a dry basis.

In another embodiment, the concentration of the FAS in the mineral slurry ranges from about 250 ppm to about 750 ppm on a dry basis and the concentration of the sodium borohydride ranges from about 50 ppm to about 500 ppm on a dry basis.

The composition disclosed herein can have a pH value of higher than about 6.0, such as higher than about 6.5, and further such as higher than about 7.0, and even further such as ranging from about 8.0 to about 13.0.

In one aspect, the mineral slurry may be prepared by blunging crude or processed clay, such as kaolin clay, with water to form an aqueous suspension. The kaolin can be dried and re-slurried. The mineral slurry may optionally comprise at least one dispersing agent for the mineral.

For example, when the mineral slurry comprises calcium carbonate, a dispersing agent, such as a sodium polyacrylate having a molecular weight less than about 10,000, may be used. Any such sodium polyacrylate dispersant known to one of ordinary skill in the art may be used.

The dispersant may be applied as a solution in water comprising, for example, from about 30% to about 50% by weight of solids, or active material based on the mineral slurry.

Crude kaolin or a kaolin product obtained from grinding or milling may be refined to remove impurities by using well known procedures generally referred to as beneficiation processes. Beneficiation can also help improve physical properties of the kaolin. In one aspect, the kaolin can be subjected to one or more well known beneficiation operations to remove undesirable impurities.

In one aspect, the slurry can be subjected to a selective flocculation process in which the impurities are flocced out of suspension while the kaolin clay remains in suspension. In one example, a high molecular weight anionic polymer having a molecular weight in excess of one million, or a molecular weight in the range of about 10 to about 15 million can be used. The anionic polymer can be a copolymer of a polyacrylamide or polyampholyte. Details of a particular selective flocculation process can be found in U.S. Pat. No. 4,227,920, to Chapman and Anderson, U.S. Pat. Nos. 6,235,107 and 6,615,987, and U.S. Pat. No. 5,685,900 to Yuan et al., which comprises ozonation, the disclosures of which are herein incorporated by reference in their entirety.

In one aspect, the mineral slurry may be subjected to a froth flotation treatment operation to remove titanium containing impurities in the froth. In one example, the slurry can be conditioned with an oleic acid to coat the air bubbles produced in the float cells. The titania minerals adhere to the air bubbles and are floated out of the kaolin slurry. An example of such a flotation process is described in U.S. Pat. No. 3,450,257, to Cundy, which is herein incorporated by reference. This process can result in an improved brightness in the kaolin pigment, i.e., a brightness gain ranging from about 0.1 to about 3 units.

The classifying (or fractionating) operation may be accomplished by using any known or after-discovered method. Exemplary methods include gravity sedimentation or elutriation, any type of hydrocyclone apparatus, or, for example, a solid bowl decanter centrifuge, disc nozzle centrifuge, or the like. The resultant coarse fraction may be discarded, used as a separate product or, for example, may be directed back to the blend tank as an auxiliary source for the coarse kaolin used in the method disclosed herein.

In one aspect, the mineral slurry may be subjected to a process known as defining. "Defining" as used herein refers to the removal of a percentage of fines, i.e., fine particles, from the kaolin suspension. In one aspect, the term "fines" as used herein refers to particles having an equivalent spherical diameter (esd) of less than about 0.25 μm. Removal of the fines can be carried out on a centrifuge, such as a Merco centrifuge, which is a high speed centrifuge. For example, the mineral slurry to be "defined" can be supplied to the centrifuge and separated into a coarse fraction and a fine fraction. In one aspect, a selected percentage by weight of the fine fraction is removed and used in the composition disclosed herein. The coarse fraction can be used for other applications.

In one aspect, the mineral slurry may be passed through a high intensity magnetic separator to remove iron containing impurities. One example of magnetic separation is described in U.S. Pat. No. 5,522,924, the disclosure of which is herein incorporated by reference in its entirety. A standard high intensity wet magnetic separator can be used. This process can also result in a brightness gain ranging from about 0.1 to about 3.0 units.

A classified mineral slurry may be further treated to improve one or more of its properties. For example, high energy liquid working, e.g., using a high speed mixer, may be applied to the product in slurry form, and subsequent re-dispersion in an aqueous medium, e.g. during makedown of a coating composition.

In one embodiment, the classified slurry may also optionally be dewatered in one of the ways well known in the art, e.g. filtration, centrifugation, evaporation and the like. Dewatering can be accomplished with a filter press. A resulting filter cake can be mixed subsequently with a dispersing agent for the mineral and converted into a fluid slurry that can be transported and sold in this form. Alternatively, the mineral may be thermally dried, for example, by introducing the fluid slurry into a spray drier, such that it may be transported in a substantially dry form.

In one aspect, the composition can comprise a kaolin blend made in accordance with the method disclosed herein. For example, the kaolin can be blended with other white minerals known in the art such as calcium carbonate, talc and gypsum.

Even further disclosed herein are products using the inventive kaolins produced in accordance with the method disclosed herein, such as coatings, e.g.

non-aqueous coatings for paper; paints; polymer products; rubber products; and barrier coating compositions.

In one aspect, the present disclosure provides a coating, such as a non-aqueous coating for paper or paperboard, comprising a kaolin produced by the methods disclosed herein. The coating can further comprise at least one binder chosen from binders conventionally used in the art. Exemplary binders include, but are not limited to, adhesives derived from natural starch and synthetic binders, including, for example, styrene butadiene, acrylic latex, vinyl acetate latex, styrene acrylic, casein, polyvinyl alcohol, polyvinyl acetate, and mixtures thereof.

Paper and paper board coatings may have different binder levels depending on the end use of the coated product. Appropriate binder levels based upon the desired end product would be readily apparent to the skilled artisan. For example, binder levels can be controlled to allow the surfaces to receive ink without disruption. The latex binder levels for paper or paper board coatings generally range from about 3% to about 30% by weight relative to the total weight of the coating. For example, the at least one binder can be present in an amount ranging from about 3% to about 30%, such as from about 10% to about 30%, by weight relative to the total weight of the coating. Paper or paper board coatings can include the inventive kaolins in an amount ranging from about 3% to about 95% by weight on a dry coating basis.

In yet another aspect, the present disclosure provides a coated paper comprising a fibrous substrate and a coating on the substrate comprising a paper coating composition as described above.

In another embodiment, the present disclosure provides a paint, such as an aqueous or non-aqueous industrial coating, architectural paint, deco paint, or art paint, comprising, in an appropriate medium, a kaolin prepared in accordance with the methods disclosed herein. The inventive kaolins disclosed herein can serve, for example, as a gloss control agent pigment in the paint. The inventive kaolin can be used as pigments and can generally be present in an amount less than the critical pigment volume. However, the inventive kaolin can also be present in higher pigment volume concentrations, such as ranging from about 1% to about 80% by weight on a dry film basis.

The paint disclosed herein can further comprise at least one component chosen from binders, such as polymeric binders, for example, water dispersible binders chosen, for example, from polyvinyl alcohol (PVA) and latex; and additives conventionally used in paints, chosen, for example, from surfactants, thickeners, biocides, defoamers, wetting agents, dispersants, and coalescents. The paint disclosed herein can comprise at least one additional pigment chosen, for example, from $TiO_2$ and calcium carbonate.

In another embodiment, the present disclosure provides a polymer product comprising a kaolin prepared in accordance with the method disclosed herein. The inventive kaolin can be present in a concentration of up to about 60% by weight of the polymer as compounded and up to about 30% by weight of the final polymer article. The inventive kaolin can be used both for resin extension (i.e., filling), $TiO_2$ extension, and reinforcement of the polymer.

The polymer product disclosed herein comprises at least one polymer resin. The term “resin” means a polymeric material, either solid or liquid, prior to shaping into a plastic article. The at least one polymer resin used herein is one which, on cooling (in the case of thermoplastic plastics) or curing (in the case of thermosetting plastics), can form a plastic material.

The at least one polymer resin, which can be used herein, may be chosen, for example, from polyolefin resins, polyamide resins, polyester resins, engineering polymers, allyl resins, thermoplastic resins, and thermoset resins.

In another embodiment, the present disclosure provides a rubber product comprising a kaolin prepared in accordance with the methods disclosed herein. The inventive kaolin composition can provide the benefits of resin extension, reinforcement of the rubber, and increased hardness of the rubber composition. The rubber product disclosed herein comprises at least one rubber chosen from natural rubbers and synthetic rubbers. For example, sulphur-vulcanisable rubbers, which can be used for manufacture of tyre treads can be used herein. Examples of the synthetic rubbers, which may be used herein, include, but are not limited to, styrene-butadiene rubber (SBR), vinyl-styrene-butadiene rubber (VSBR), butadiene rubber (BR), and neoprene rubber or polyisoprene. The SBR may be emulsion SBR (E-SBR) or solution SBR (S-SBR). The VSBR may be solution VSBR(S-VSBR). And examples of the BR include, but are not limited to, cis-1,3-polybutadiene rubber and cis-1,4-polybutadiene rubber. An example of the natural rubbers, which can be used herein, is Standard Malaysian natural rubber.

The rubber product disclosed herein may further comprise at least one additive chosen from conventional additives used in the art, for example, extender oils and mineral and synthetic fillers. The rubber may comprise the inventive kaolin in an amount up to about 35% by weight as formulated.

All amounts, percentages, and ranges expressed herein are approximate.

The present invention is further illuminated by the following non-limiting examples, which are intended to be purely exemplary of the invention.

EXAMPLE

In this example, a fine Georgia hard kaolin crude was used. The crude was blunged until the solid concentration was about 72% by weight, and then was diluted with water until the solid concentration was about 70%. The diluted crude was then screened using a 150 mesh screener. The screened crude was then processed according to one of the following operations at a temperature of 27° C.

In the control operation, no additional ingredient was added.

In other operations, i.e., operations (A), (B), (C), and (D), the pH value of the screened crude was adjusted to about 9.6 using NaOH.

In operation (A), 2 pounds per ton of sodium hydrosulfite on a dry basis relative to the total amount of the crude were added. The reaction lasted for about 30 minutes and the brightness of the mineral slurry was measured. The reaction was continued for about 24 hours, and the brightness of the mineral slurry was measured again.

In operation (B), 2 pounds per ton of sodium borohydride on a dry basis relative to the total amount of the crude were added. The reaction lasted for about 30 minutes and the brightness of the mineral slurry and the final pH of the crude were measured. The reaction was then continued for about 24 hours, and the brightness of the mineral slurry was measured again.

In operation (C), 2 pounds per ton of FAS and 1 pound per ton of borohydride on a dry basis relative to the total amount of the crude were added. The reaction lasted for about 24 hours, and the brightness of the mineral slurry was measured.

In operation (D), 5 pounds per ton of FAS and 2 pounds per ton of borohydride on a dry basis relative to the total amount of the crude were added. The reaction lasted for about 30 minutes and the brightness the mineral slurry and the final pH of the crude were measured. The reaction was continued for about 24 hours, and the brightness of the mineral slurry was measured again.

The brightness and the color of the bleached clay were measured using a Technobrite Eric 500 spectrophotometer (manufactured by Technodyne Corp.) by known processes. The brightness is presented as % GE. The color readings are presented as L (whiteness measurement/Star Lab), a* (red to green spectrum), and b* (blue to yellow spectrum).

The results are shown in the tables below:

TABLE 1

| | 30 minutes reaction time | | | |
|---|---|---|---|---|
| Operation | Control | A (Comparative) | B (Comparative) | D (Inventive) |
| Final pH | 8.3 | | 10.4 | 10.0 |
| Brightness (% GE) | 80.4 | 80.5 | 81.54 | 84.01 |
| L | 93.69 | 93.70 | 93.80 | 93.87 |
| a* | −0.1 | −0.1 | −0.03 | −0.21 |
| b* | 6.04 | 5.99 | 5.32 | 3.60 |

TABLE 2

| | 24 hours reaction time | | | | |
|---|---|---|---|---|---|
| Operation | Control | A (Comparative) | B (Comparative) | C (Inventive) | D (Inventive) |
| Brightness (% GE) | 80.4 | 82.26 | 81.68 | 83.18 | 83.76 |
| L | 93.69 | 93.80 | 93.81 | 93.94 | 93.82 |
| a* | −0.1 | −0.15 | −0.13 | −0.14 | −0.12 |
| b* | 6.04 | 4.80 | 5.26 | 4.32 | 3.72 |

As shown in the tables, the kaolin slurry subject to the method of bleaching according to the present disclosure had higher brightness than that subject to the bleaching method with hydrosulfite or borohydride alone.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising:
a mineral slurry,
a formamidine sulfinic acid, and
a borohydride.

2. The composition according to claim 1, wherein the mineral slurry comprises at least one ingredient chosen from kaolin, talc, gypsum, mica, silica, feldspar, barium sulfate, and alkaline earth metal carbonates.

3. The composition according to claim 2, wherein the alkaline earth metal carbonate comprises calcium carbonate.

4. The composition according to claim 1, wherein the formamidine sulfinic acid is present in a concentration ranging from about 125 ppm to about 2,500 ppm on a dry basis.

5. The composition according to claim 4, wherein the formamidine sulfinic acid is present in a concentration ranging from about 250 ppm to about 1,000 ppm on a dry basis.

6. The composition according to claim 1, wherein the borohydride comprises sodium borohydride.

7. The composition according to claim 6, wherein the sodium borohydride is present in a concentration of at least about 5 ppm on a dry basis.

8. The composition according to claim 7, wherein the sodium borohydride is present in a concentration ranging from about 20 ppm to about 1,000 ppm on a dry basis.

9. The composition according to claim 8, wherein the sodium borohydride is present in a concentration ranging from about 50 ppm to about 500 ppm on a dry basis.

10. The composition according to claim 1, wherein the formamidine sulfinic acid is present in a concentration ranging from about 125 ppm to about 2,500 ppm on a dry basis and the borohydride is present in a concentration ranging from about 125 ppm to about 1,000 ppm on a dry basis.

11. The composition according to claim 10, wherein the formamidine sulfinic acid is present in a concentration ranging from about 250 ppm to about 750 ppm on a dry basis and the borohydride is present in a concentration ranging from about 125 ppm to about 500 ppm on a dry basis.

12. The composition according to claim 1, wherein the composition has a pH value of higher than about 6.0.

13. The composition according to claim 12, wherein the composition has a pH value ranging from about 8.0 to about 13.0.

14. A method of reductively bleaching a mineral slurry, comprising including in the mineral slurry an effective amount of a formamidine sulfinic acid and an effective amount of a borohydride to reductively bleach the mineral slurry.

15. The method according to claim 14, wherein the mineral slurry comprises at least one ingredient chosen from kaolin, talc, gypsum, mica, silica, feldspar, barium sulfate, and alkaline earth metal carbonates.

16. The method according to claim 15, wherein the alkaline earth metal carbonate comprises calcium carbonate.

17. The method according to claim 14, wherein the effective amount of the formamidine sulfinic acid ranges from about 125 ppm to about 2,500 ppm on a dry basis.

18. The method according to claim 17, wherein the effective amount of the formamidine sulfinic acid ranges from about 250 ppm to about 1,000 ppm on a dry basis.

19. The method according to claim 14, wherein the borohydride comprises sodium borohydride.

20. The method according to claim 19, wherein the effective amount of the sodium borohydride is at least about 5 ppm on a dry basis.

21. The method according to claim 20, where in the effective amount of the sodium borohydride ranges from about 20 ppm to about 1,000 ppm on a dry basis.

22. The method according to claim 21, where in the effective amount of the sodium borohydride ranges from 50 ppm to 500 ppm on a dry basis.

23. The method according to claim 14, where in the effective amount of the formamidine sulfinic acid ranges from about 125 ppm to about 2,500 ppm on a dry basis and the effective amount of the borohydride ranges from about 125 ppm to about 1,000 ppm on a dry basis.

24. The method according to claim 23, wherein the effective amount of the formamidine sulfinic acid ranges from about 250 ppm to about 750 ppm on a dry basis and the effective amount of the borohydride ranges from about 125 ppm to about 500 ppm on a dry basis.

25. The method according to claim 14, wherein the final slurry has a pH value of higher than about 6.0.

26. The method according to claim 25, wherein the final slurry has a pH value ranging from about 8.0 to about 13.0.

* * * * *